United States Patent [19]
Furusawa et al.

[11] Patent Number: 5,620,279
[45] Date of Patent: Apr. 15, 1997

[54] ARTIFICIAL WATER PLANT SYSTEM FOR CONTROLLING SEDIMENT TRANSPORT ON A WATER BED

[75] Inventors: Hironobu Furusawa, Osaka; Kazuki Oda, Sakai, both of Japan

[73] Assignee: Toyo Boseki Kabushiki Kaisha, Osaka, Japan

[21] Appl. No.: 500,328

[22] Filed: Jul. 10, 1995

[30] Foreign Application Priority Data

Jul. 11, 1994 [JP] Japan .................. 6-158811

[51] Int. Cl.⁶ .................. E02B 3/00
[52] U.S. Cl. .................. 405/24; 405/28
[58] Field of Search .................. 405/21, 24, 25, 405/28

[56] References Cited

U.S. PATENT DOCUMENTS

| | | |
|---|---|---|
| 3,299,640 | 1/1967 | Nielsen . |
| 3,323,310 | 6/1967 | Arpin .................. 405/24 |
| 3,559,407 | 2/1971 | Schuur . |
| 3,590,585 | 7/1971 | Winter .................. 405/24 |
| 4,439,059 | 3/1984 | Kikuzawa et al. .................. 405/25 |
| 4,478,533 | 10/1984 | Garrett .................. 405/24 |
| 5,454,665 | 10/1995 | Hughes, Sr. .................. 405/24 |

FOREIGN PATENT DOCUMENTS

| | | |
|---|---|---|
| 8231725.9 | 2/1983 | Germany . |
| 6400166 | 7/1964 | Netherlands . |
| 7016749 | 5/1971 | Netherlands . |
| 7005621 | 7/1971 | Netherlands . |
| 7109980 | 1/1972 | Netherlands . |
| 1303073 | 1/1973 | United Kingdom . |
| 1323070 | 7/1973 | United Kingdom . |
| 1355979 | 6/1974 | United Kingdom . |
| 2127469 | 4/1984 | United Kingdom . |

*Primary Examiner*—George A. Suchfield
*Attorney, Agent, or Firm*—Foley & Lardner

[57] ABSTRACT

An artificial water plant system for trapping bottom sediments in water to protect sand beach against erosion in which the water plant comprises a rod-shaped or tubular molding product having a circular or non-circular cross sectional shape and comprising a thermoplastic elastomer alone having a flexural modulus of 500 to 5,000 kg/cm² or a composite body comprising a sheath portion constituted with the thermoplastic elastomer and a core portion constituted with synthetic fiber bundles.

7 Claims, 4 Drawing Sheets

ARTIFICIAL WATER PLANT (TYPE C)

---- INITIAL SAND BOTTOM TOPOGRAPHY

—— SAND BOTTOM TOPOGRAPHY AFTER TESTING

⋘⋙ ARTIFICIAL WATER PLANT

DISTANCE (M) FROM WATER'S EDGE

ARTIFICIAL WATER PLANT (TYPE D) FOR COMPARISON

---- INITIAL SAND BOTTOM TOPOGRAPHY

—— SAND BOTTOM TOPOGRAPHY AFTER TESTING

⋘⋙ ARTIFICIAL WATER PLANT

DISTANCE (M) FROM WATER'S EDGE

ARTIFICIAL WATER PLANT SYSTEM FOR CONTROLLING SEDIMENT TRANSPORT ON A WATER BED

BACKGROUND OF THE INVENTION

1. Field of the Invention

The present invention concerns an artificial water plant system installed on nearshore sea bottom and/or lake bottom, which has an objective of preventing seashores and/or lakeshores from being eroded by wave action by means of a control mechanism of sediment transport which consists of onshore bottom currents induced by wave-water plant interaction and wave energy dissipation by this system.

2. Description of the Prior Art

Rigid structures mainly made of concrete or stone materials such as coastal rivetments, groins, wave absorbing works and detached breakwaters have been constructed or installed so that large offshore waves do not directly reach a seashore. Such rigid structures however, involve an environmental problem of damaging existing ecosystems and worsen the landscape of a seashore. Another problem is that the sea bottom around these rigid structures is scoured by waves breaking and strong bottom currents induced by wave-structure interaction. Subsequently, these structures are subjected to subsidence and collapse.

Submerged breakwaters or artificial reefs have been developed and constructed for landscape conservation and water quality conservation due to a good exchange of sea water. They also, however, involve some problems likely to cause scouring due to waves breaking and strong bottom currents induced by wave-structure interaction and also present navigation hazards for ships.

On the contrary, flexible structures are also provided, such as fibrous or strand-like polymeric materials entangled with each other, nets or swingable rubber sheets. Such flexible structures are preferred in view of their water quality conservation properties since they swing by waves and have sufficient openings for sea water to pass through. In addition they have the advantage of not deteriorating the landscape since the structures are disposed on the sea bottom and do not appear above the water surface.

Since drag forces exerted on those flexible structures increase due to deposition of marine organisms on these structures, they tend to easily fall down due to the weight of deposits such as shells. Also, a screw propeller of a ship may easily catch these structures when the ship goes in the area of the structures, which results in both the ship and the structures being liable to suffer damage. Thus, they involve a drawback of resulting in problems in view of the long-lasting property of the aimed effect and durability. Thus, no effective means for practical use have yet been provided until the present invention.

OBJECT OF THE INVENTION

Accordingly, an object of the invention is to provide an artificial water plant system capable of being installed on the shore bottom in order ① not to worsen the landscape of seashore and/or lakeshore, ② to withstand repeated impacts and flexure caused by waves for a long period of time, ③ to have self-standing capability, that is to have sufficient rigidity to provide to reduce bottom currents near the seashore or lakeshore.

In addition, the artificial water plants should be capable of swinging separately or individually, and they should be capable of retaining their initial performance for a long period of time due to their shape which has no substantial flat portion that makes heavy-weight shells such as oysters less prone to deposit. The shells will easily fall off, if deposited, due to the swinging or impact by waves. After being unloaded by an applied force, they should be capable of immediately restoring and self-standing by self-elasticity, even if the system is temporarily loaded down by large external force such as big waves or a ship. This results in giving less damage to the bottom or the screw propeller of the ship or to the structures themselves even if the ship should run aground.

SUMMARY OF THE INVENTION

The foregoing object can be attained in accordance with the present invention in an artificial water plant system for controlling sediment transport on a water bed. The system includes a rod-shaped or tubular molding product having a circular or non-circular cross sectional shape, comprising a thermoplastic elastomer alone having an elasticity modulus from 500 to 5000 kg/cm$^2$, or a composite body comprising a sheath of the thermoplastic elastomer and a core of a bundle of synthetic fibers.

Since the artificial water plant according to the present invention is made of the rod-shaped or tubular thermoplastic elastomer molding product having a self-standing property, excellent deflectibility and restorabilty, an artificial water plant system capable of swinging appropriately by the action of waves can be attained by installing it on a water bottom or sea bottom. This is achieved by embedding respective one ends of a plurality of the molding products into heavy-weight materials such as concrete, while leaving the respective other ends free with no constraint.

For providing the artificial water plant according to the present invention with a preferred self-standing property and rigidity in order to attain the function of trapping bottom sediment, it is necessary that the material to be used has the elasticity modulus of more than 500 kg/cm$^2$. For instance, an artificial water plant comprising a soft thermoplastic elastomer having about 400 kg/cm$^2$ of elasticity modulus, or a usual rubber of a further lower elasticity modulus both have self-standing properties in water. Since such material, however, tends to flex easily at root portions when being subject to even a small wave force, the disturbing effect of the bottom current is abruptly reduced to remarkably lower the function of trapping bottom sediment.

The higher the rigidity of the artificial water plant, the greater the trapping function for the bottom sediment. But, an artificial water plant of higher rigidity has a drawback of being easily broken down since it undergoes large impact by waves.

That is, an artificial water plant of large flexural rigidity formed of a material having the elasticity modulus of not less than 5000 kg/cm$^2$ is excellent in the self-standing property. However, it undergoes excess flexural moment on its root portions when it is subject to a large wave force, and its root portions are liable to be broken down by repeated waves.

Further, a rigid artificial water plant is generally poor in flex-wear resistance and restorability from deformation.

In order to effectively trap sediment in the bottom current, it is necessary that the root portion of the artificial water plant retain the self-standing property to disturb the bottom current even when it undergoes a horizontal load due to the bottom current. But it is advantageous, in view of the durability, that the upper portion of the artificial water plant be deflected by the waves rather than standing upright resisting the wave force. Since the amount of sand suspended towards the top of the plant is small compared with the amount at the bottom, a swingable artificial water plant comprising a material having the modulus of elasticity within the specified range of the present invention is comparable with a more rigid artificial water plant in view of the trapping efficiency for bottom sediment.

That is, while individual artificial water plants swing with the waves, since the artificial water plants undergoing wave impacts are bent in a moderate arcuate shape, their root portions stand substantially upright, thus, effectively trapping sediment at the bottom, whereas the upper portions swing in a horizontal direction so that they are not heavily subjected to the wave force impact. Therefore, the artificial water plant according to the present invention has excellent durability.

Further, it is another feature of the present artificial water plant that at least about ⅔ of the upper portion of the artificial water plant is not constrained in a lateral direction, but instead, the plant can swing individually by waves.

Accordingly, the product according to the present invention is different, in view of its purpose and structure, from the known wave absorbing structures, and it does not intend to decay waves at the surface but instead retains them in a natural state.

As the thermoplastic elastomer in the present invention, there can be mentioned, for example, a polyester elastomer such as polyester-polyether block copolymer or polyester-polyester block copolymer, a polyamide elastomer, a polyurethane elastomer such as polyether type polyurethane or polyester type polyurethane and a polyolefin type elastomer. Any of them can be used so long as the flexural modulus is within a range described previously.

Among the thermoplastic elastomers, those of excellent flex-fatigue resistance are preferred and, specifically, an elastomer which can flex by the number of more than 80,000 cycles, particularly, more than 120,000 cycles until the development of large cracks. A flex test, such as using a de Mattla flex fatigue test machine according to a flex test of JIS K6301 is preferred. As such an elastomer, a polyester elastomer can be mentioned.

The cross sectional shape of the artificial water plant is circular or non-circular. The circular shape referred to in the present invention also includes elliptic shapes or eccentric circular shapes, while the non-circular shapes include such cross sectional shapes as polygonal shapes, uneven shapes or combined shapes of curves and linear lines in which a shape with lesser number of linear sides is preferred. This means that the artificial water plant has no substantial flat portion on which shells, etc. are liable to be deposited.

Thus, even if small shells are deposited, numerous shells can not be deposited and if shells are deposited to some extent, they fall off by the action of big waves since the artificial water plant swings by waves.

Since the bottom current near the waterside includes not only a component perpendicular to the shore but also a component along the shore, the artificial water plant preferably has such a cross sectional shape that the flexural modulus does not vary depending on the flexing direction, so that the artificial water plant flexes smoothly in all directions. In view of the above, a major diameter-to-minor diameter ratio of the cross section is preferably within a range from 1 to 3.

Further, an artificial water plant having small thickness axial fins which do not greatly change the flexural rigidity along the main stem has greater trapping efficiency for the sediment. Further, the total number of the artificial water plants required can be reduced by using the artificial water plants with fins.

The artificial water plant of the shape described above has a remarkable advantage of not entwining a screw propeller when a fishing boat or the like runs aground. However, there is a problem that the artificial water plants may be detached by the rotation of the screw propeller. To solve this problem an artificial water plant of greater durability can be provided in such a case by incorporating a bundle of strong synthetic fibers as a core.

However, it is contrary to the purpose of the present invention if the synthetic fiber bundles for reinforcement greatly increase the flexural rigidity of the artificial water plant.

If the reinforcing synthetic fiber bundles have a remarkably greater flexural rigidity than the elastomer constituting the artificial water plant, the force of the waves impact mainly on the reinforcing fiber bundles and the flex-fatigue resistance of the fiber bundles predominantly control the entire life, thus making it difficult to obtain a long time durability.

An artificial elastomeric water plant incorporating steel wires or metal ropes has a large difference of the flexural rigidity between the core material and the coating material thereon, so that there is the disadvantage that the interface between the core material and the cover material is delaminated in a swinging and flex test in a relatively short period of time, to cause rusting or break down of the core portion.

Accordingly, twisted synthetic fiber bundles such as ropes are suitable because of their easy flexurality and flexibility for the reinforcement of the artificial water plant according to the present invention.

The artificial water plant composited with the synthetic fiber bundles in the present invention increases the rigidity preferably by up to 20% as compared with an artificial water plant of an identical size comprising a thermoplastic elastomer alone not using the synthetic fiber bundles.

Further, for improving adhesion between the synthetic fiber bundles and the elastomer, suitable combinations can include, for example, polyester fiber bundle and polyester elastomer, nylon fiber bundle and polyamide elastomer or polyurethane elastomer, and polyolefin fiber bundle and polyolefin elastomer.

The size of the artificial water plant molding product in the present invention has no particular restriction so long as it has such a size as to be capable of swinging in water and exhibiting an effect of trapping bottom sediment as described above. Although varying depending on the modulus of elasticity of the thermoplastic elastomer used, the water plant usually has a cross section, preferably, having a major diameter from 2 to 50 mm and a minor diameter of about 1 to 40 mm. While the length can be selected properly depending on the depth of the water, the length is preferably from 20 to 150 cm or about ¼ to ½ of the water depth when it is used near the waterside and the artificial water plant is preferably disposed such that it does not protrude above the water level.

The molding product may also be of such a shape that, a plurality of molding products are connected and integrated together at one end or the vicinity thereof.

The artificial water plant can be produced from the thermoplastic elastomer alone by extrusion molding or injection molding. Alternatively, it can be produced by using an extrusion machine having a cross head, which pulls synthetic fiber bundles into the cross head die and covers them with a thermoplastic elastomer to continuously form a composite product of the thermoplastic elastomer/synthetic fiber bundles. The bundles are then cut into an appropriate length. Further, a molding product with fins can be produced easily by changing the shape of the metal mold of the injection molding machine, or the shape of a die of the extrusion molding machine.

On the other hand, the elastomer can be blown upon production of the artificial water plant according to the present invention resulting in a formed elastomer. This facilitates deposition of natural algae or water plants to the artificial water plants. Algae deposits and water plants grow easily on the surface of the elastomer foamed at a low degree.

Since the artificial water plant according to the present invention can be simply colored by a pigment or the like during production, it can be easily conformed with the environment. Further, various kinds of known additives such as UV-absorbers, stabilizers and fillers can be blended in addition to the colorant.

The artificial water plant molding product is usually fixed by being embedded at one end into heavy-weight materials such as concrete either directly or by way of other materials. The artifical water plants are installed together with the heavy-weight materials on the sea bottom, lake bottom or river bottom.

There is no particular restriction on the way the artificial water plant molding products are embedded into the heavy-weight materials but usually the molding products are embedded at a predetermined interval Individually or as a group of them bundled together.

The end of the molding product to be embedded preferably has a protrusion or recess, since the molding product can surely be secured to the heavy-weight materials.

Since it is an object of the present invention to disturb the water flow at the bottom and trap the sediment, there is no particular requirement of disposing the artificial water plant sets at an equal interval.

EXAMPLE

The present invention will be explained by way of examples but the present invention is not restricted only thereto.

Example 1

An artificial water plant as described below was produced.

Figure 1:
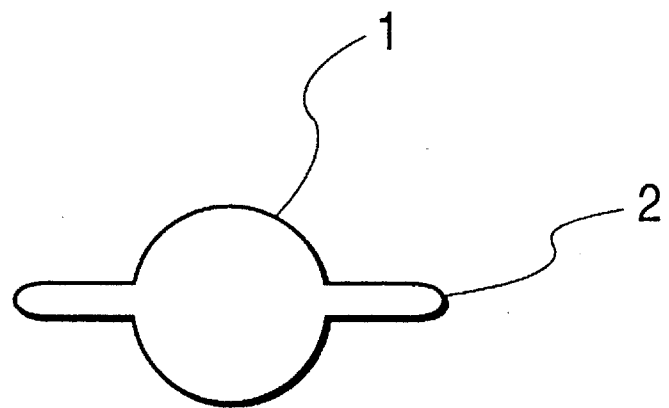
FIG. 1 is a view illustrating a cross sectional shape for one example of an artificial water plant (Type A) according to the present invention.
Figure 2:
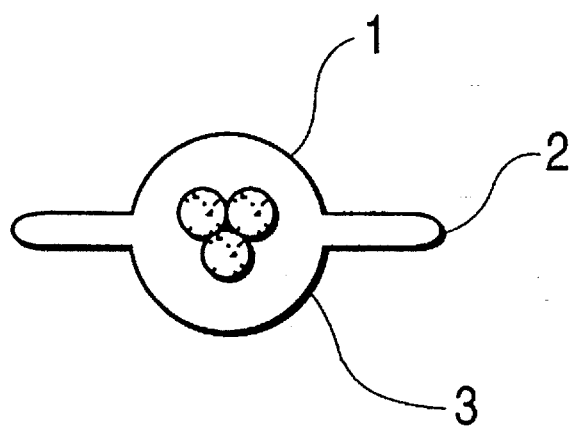
FIG. 2 is a view also illustrating a cross sectional shape for another example of an artificial water plant according to the present invention.
Figure 3:
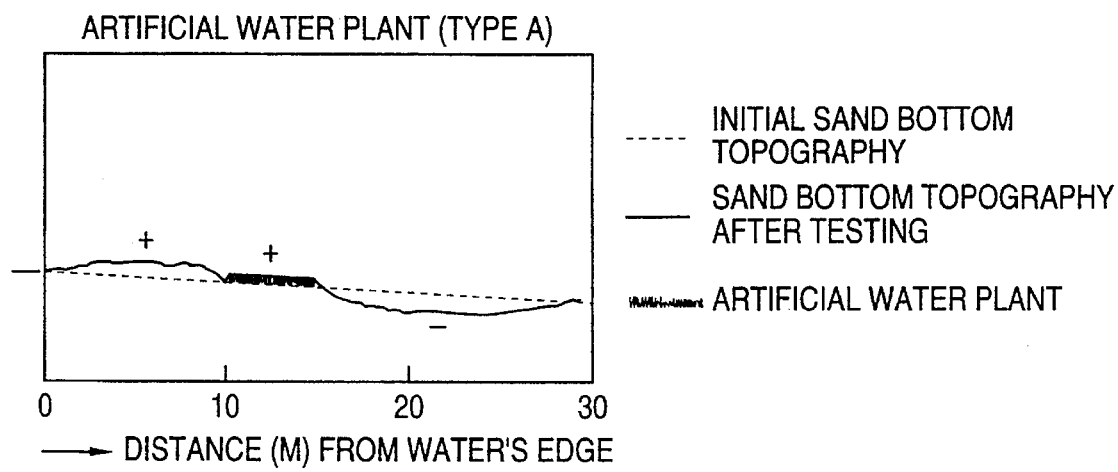
FIG. 3 is a view illustrating the change of the bottom topography obtained by a 24-hour model test in a wave tank for the case of installing the artificial water plant (Type A) according to the present invention.
Figure 4:
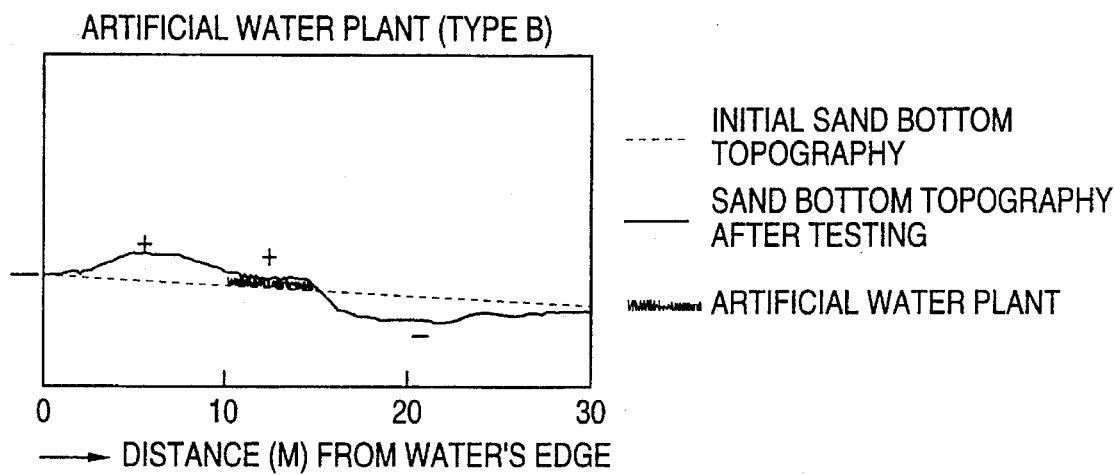
FIG. 4 is a view illustrating the change of the bottom topography obtained by a 24-hour model test in a wave tank for the case of installing an artificial water plant (Type B) according to the present invention.
Figure 5:
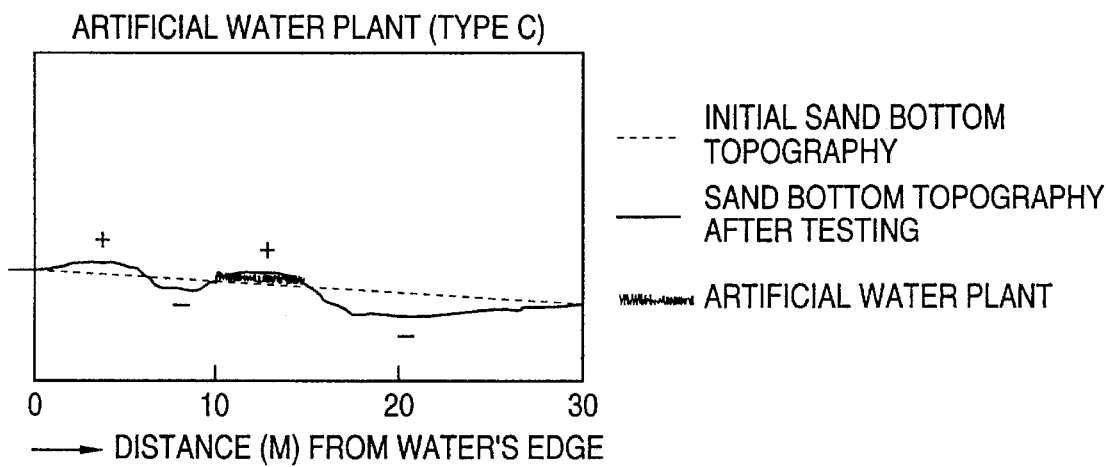
FIG. 5 is a view illustrating the change of the bottom topography obtained by a 24-hour model test in a wave tank for the case of installing an artificial water plant (Type C) according to the present invention.
Figure 6:
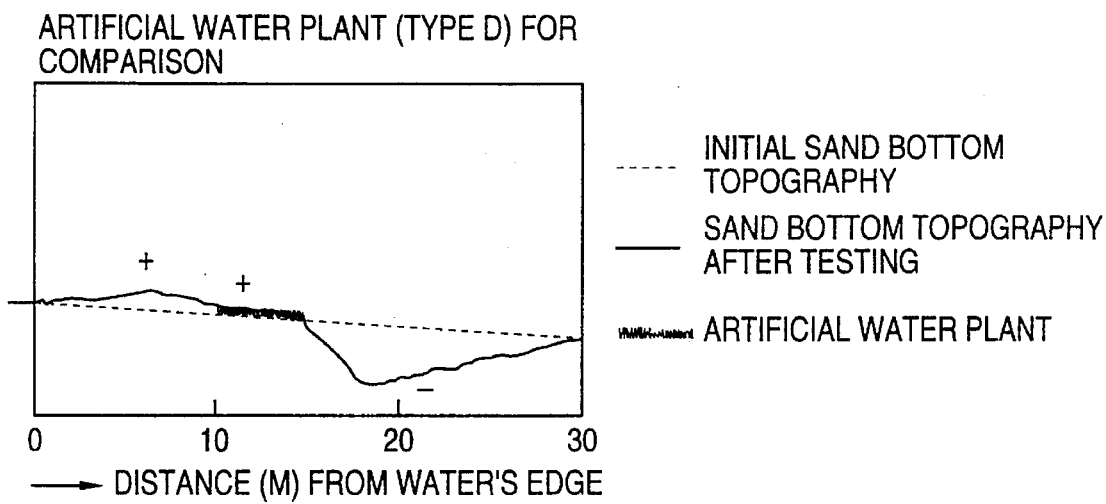
FIG. 6 is a view illustrating the change of the bottom topography obtained by a 24-hour model test in a wave tank for the case of installing the artificial water plant (Type D) according to the present invention.
Figure 7:
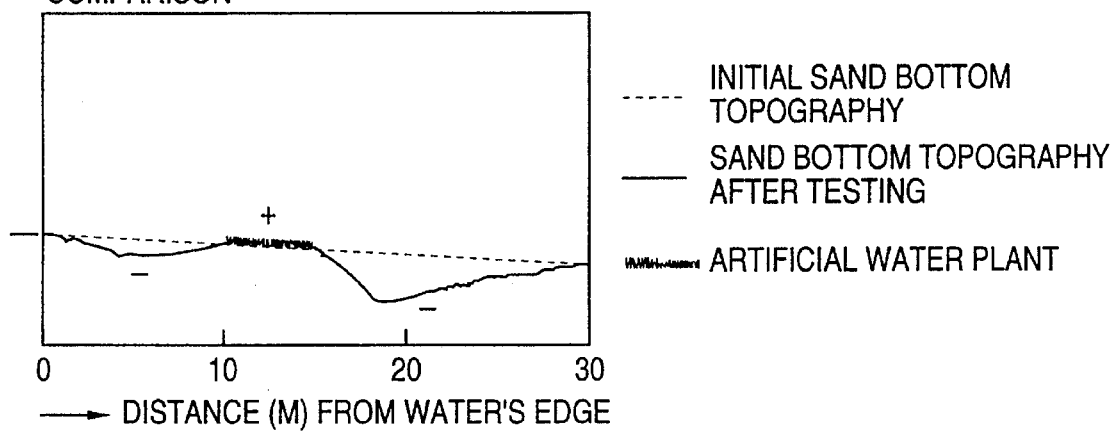
FIG. 7 is a view illustrating the change of the bottom topography obtained by a 24-hour model test in a wave tank for the case of installing an artificial water plant (Type E) according to the present invention.
Figure 8:
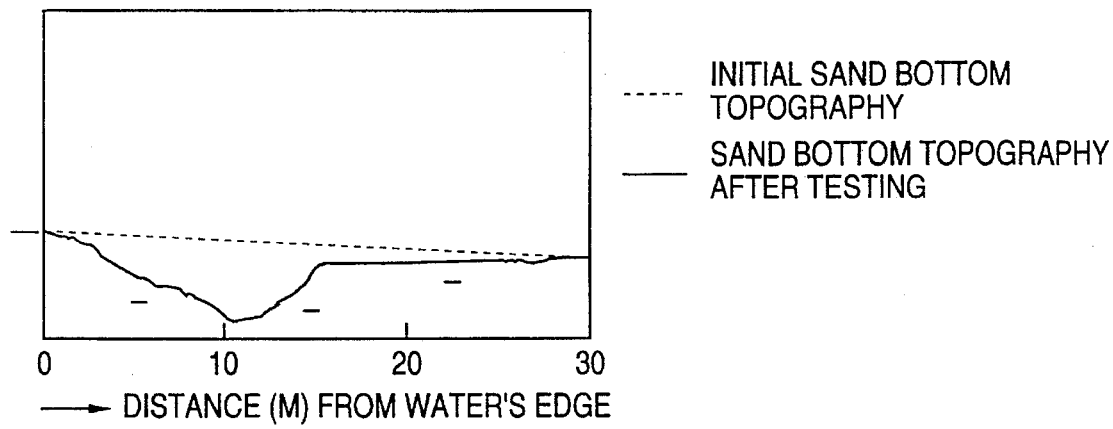
FIG. 8 is a view illustrating the change of the bottom topography obtained by a 24-hour model test in a wave tank for the case of installing an artificial water plant (Type F) according to the present invention.

A: A polyester elastomer having a flexural modulus of 3000 kg/cm$^2$ was used and fabricated by an extrusion molding process into a long shaped article having a cross sectional shape as shown in FIG. 1, having a circular cross section with a 10 mm diameter for a main stem 1 and a pair of fins 2 opposed to each other along the axis on the surface (1 mm thickness, 5 mm width). This article was then cut into 40 cm length to obtain an artificial water plant A.

B: The same polyester elastomer having the same outer shape as in A was extruded to coat three twisted polyester ropes 3 each of 7 mm diameter by using an extrusion machine having a cross head die, and then cut into 40 cm length to obtain an artificial water plant.

C: A long shaped article having an elliptic cross section with 10 mm major axis/5 mm minor axis in the cross section of the main stem portion was produced by an extrusion molding process from a polyurethane elastomer having a flexural modulus of 800 kg/cm$^2$ and then cut into 40 cm length, to produce an artificial water plant C.

D: A plate-shaped article 5 mm thickness, 50 mm width and 40 cm length was produced from a hard rubber having a flexural modulus, after vulcanization, of 200 kg/cm$^2$ by hot press vulcanization into an artificial water plant D for comparison.

E: An artificial water plant E was produced for comparison by using a copolymer nylon resin of the same shape as in A and having a flexural modulus of 10,000 kg/cm$^2$.

An anti-slip off recess is formed on one end for each of the artificial water plants A to E. The plants were then embedded and secured at 10 cm intervals both in the lateral and longitudinal directions and at a depth of 10 cm individually in a 1 m square and 20 cm height concrete sheet to form an unit for applying experiments to an artificial water plant system.

Five model sheets of such artificial water plant set units were arranged at a depth of 0.5 m on a movable bed with a slope of 1/20 in a large-sized wave tank. After being exposed to waves with a period of 2.2 sec and a wave height of 40 cm for 24 hours, bottom topographies of the movable bed were compared.

As a comparison method of indicating the effect of installing the artificial water plant set, the change of depth of the bottom surface from the water surface was measured before and after the test. It was then examined whether the elevation of the bottom was decreased or increased as compared with the initial bottom surface.

For three regions, i.e., from the shore to the artificial water plant/artificial water plant area/offshore area, the variation amount in the elevation of the bottom surface after experiment was integrated toward the offshore direction, and the integrated change in the elevation of the bottom surface is indicated in each of the areas by "+" for deposition and by "−" for erosion, which are shown in FIG. 3 to FIG. 8.

Example 2

A flex test was conducted by fixing artificial water plants A to B at one end thereof. The other ends were reciprocated 30 cm ahead along an arcuate trace and bending by $10^6$ cycles at 30 cycles/min rate until the top end flexed rightward and leftward each by 90° relative to the state as attached (semi-circular reciprocal movement). The flexural endurance of the artificial water plant in water for long period of time was evaluated by simulation.

TABLE 1

|  | Situation of artificial water plant after flex test |
|---|---|
| Artificial water plant A | no abnormality |
| Artificial water plant B | no abnormality |
| Artificial water plant C | no abnormality |
| Artificial water plant D (Comp. Example) | break down by flex fatigue |
| Artificial water plant E (Comp. Example) | cracking occurred to root portions at an early stage, resulting in greatly reduced flexural rigidity |

Example 3

Experiment application units for artificial water plant sets A to E having the same constitution as in Example 1 were installed at a point of 2 m water depth in the seashore of Iwakuni City, Yamaguchi Prefecture for two months in a summer season to investigate the state of deposition of algae and shells.

Results are shown in Table 2.

TABLE 2

|  | Appearance of artificial water plant after two months immersing in sea |
|---|---|
| Artificial water plant A | Stood upright although with deposition of sea weeds, and small shells of less than 1 cm |
| Artificial water plant B | Stood upright although with deposition of sea weeds, and small shells of less than 1 cm |
| Artificial water plant C | Stood upright although with deposition of sea weeds, and small shells of less than 1 cm |
| Artificial water plant D (Comp. Example) | Inclined greatly by the deposition of sea weeds and shells |
| Artificial water plant E (Comp. Example) | Stood upright although with deposition of sea weeds and small shells of less than 1 mm |

It can be seen that the artificial water plant system according to the present invention has a remarkable effect of efficiently trapping sediment transported on the shore bottom and preventing sand at the seashore from being taken away in the offshore direction.

It can also be seen that the artificial water plant according to the present invention is excellent in flexural endurance, allows less deposition of heavy shells, can retain a self-standing property and can retain the initial performance for a long period of time.

What is claimed is:

1. An artificial water plant system for controlling sediment transportation on a water bed, which is a rod-shaped or tubular molding product having a circular or non-circular cross sectional shape and comprising a thermoplastic elastomer alone having a flexural modulus of from 500 to 5000 kg/cm$^2$ or a composite body having a sheath constituted with said thermoplastic elastomer and a core constituted with synthetic fiber bundles.

2. An artificial water plant system as defined in claim 1, wherein the number of flexing till the development of large cracking is more than 80,000 cycles, in a flex test for flex-fatigue resistance of the thermoplastic elastomer according to JIS K6301 by de Mattia fatigue testing machine.

3. An artificial water plant system as defined in claim 1, wherein fins are provided in an axial direction of a stem of the rod-shaped or tubular molding product.

4. An artificial water plant system as defined in claim 1, wherein the cross section has 2 to 50 mm of a major diameter and 1 to 40 mm of a minor diameter.

5. An artificial water plant system as defined in claim 1, wherein the thermoplastic polymer is foamed.

6. An artificial water plant system as defined in claim 1, wherein one end of the artificial water plant is embedded into a heavy-weight material.

7. An artificial water plant system as defined in claim 6, wherein the heavy-weight material comprises concrete.

* * * * *